United States Patent
Scott et al.

(10) Patent No.: US 9,503,342 B2
(45) Date of Patent: *Nov. 22, 2016

(54) METHOD FOR TIME AWARE INLINE REMOTE MIRRORING

(71) Applicant: Viavi Solutions Inc., Milpitas, CA (US)

(72) Inventors: Alistair Scott, Lafayette, CO (US); Samuel M. Bauer, Colorado Springs, CO (US); Michael Stevens, Fountain, CO (US)

(73) Assignee: Viavi Solutions Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/822,223

(22) Filed: Aug. 10, 2015

(65) Prior Publication Data

US 2016/0156533 A1 Jun. 2, 2016

Related U.S. Application Data

(60) Continuation of application No. 14/194,177, filed on Feb. 28, 2014, now Pat. No. 9,106,520, which is a division of application No. 13/104,708, filed on May 10, 2011, now Pat. No. 8,705,395.

(60) Provisional application No. 61/355,040, filed on Jun. 15, 2010, provisional application No. 61/355,075, filed on Jun. 15, 2010.

(51) Int. Cl.
*G01R 31/08* (2006.01)
*H04L 12/26* (2006.01)

(52) U.S. Cl.
CPC ....... *H04L 43/0829* (2013.01); *H04L 12/2697* (2013.01); *H04L 43/062* (2013.01);

(Continued)

(58) Field of Classification Search
CPC .................................................. H04L 43/062
USPC .................. 370/235, 386–388, 428–429, 370/395.1–427, 352–355; 709/223–224
See application file for complete search history.

(56) References Cited

U.S. PATENT DOCUMENTS 5,185,860 A 2/1993 Wu
6,108,782 A 8/2000 Fletcher et al.
(Continued)

FOREIGN PATENT DOCUMENTS

GB 2426145 11/2006
WO 2009001067 12/2008

OTHER PUBLICATIONS

Enns et al., "Device Discovery Protocol (DDP) draft-marques-ddp-00.txt; draft-marques-ddp-00.txt", IETF Standard-Working-Draft, Internet Engineering Task Force, IETF, CH, May 2003, 10 pages.
(Continued)

*Primary Examiner* — Iqbal Zaidi
(74) *Attorney, Agent, or Firm* — Harrity & Harrity, LLP

(57) ABSTRACT

A method of monitoring packet traffic is provided. The method includes: at a first access point, capturing portions of traffic packets passing therethrough separated by time intervals; encapsulating the portions of traffic packets thereby forming encapsulated packets and adding timestamps to the encapsulated packets so as to preserve the portions of traffic packets and information related to the time intervals; transmitting the encapsulated packets over a network; decapsulating the encapsulated packets so as to obtain replay packets and the capture timestamp, wherein the replay packets include the portions of the traffic packets; and, transmitting the replay packets separated by the time intervals, wherein the timestamps are used to reproduce the time intervals so as to imitate the traffic packets passing through the first access point.

20 Claims, 6 Drawing Sheets

(52) U.S. Cl.
CPC ............. *H04L43/106* (2013.01); *H04L 43/12* (2013.01); *H04L 43/50* (2013.01); *H04L 43/026* (2013.01); *H04L 2212/00* (2013.01)

(56) References Cited

U.S. PATENT DOCUMENTS

| | | |
|---|---|---|
| 6,286,039 B1 | 9/2001 | Van Horne et al. |
| 7,336,673 B2 | 2/2008 | Ilnicki et al. |
| 7,337,233 B2 | 2/2008 | Dillon |
| 7,506,065 B2 | 3/2009 | LaVigne et al. |
| 7,688,754 B2 | 3/2010 | Williams |
| 7,733,773 B2 | 6/2010 | Wager et al. |
| 7,804,832 B2 | 9/2010 | Andrews et al. |
| 8,705,395 B2 | 4/2014 | Scott et al. |
| 9,106,520 B2 | 8/2015 | Scott et al. |
| 2001/0039579 A1* | 11/2001 | Trcka ................ G06F 21/552 709/224 |
| 2003/0223376 A1 | 12/2003 | Elliott et al. |
| 2004/0001443 A1 | 1/2004 | Soon et al. |
| 2004/0208129 A1 | 10/2004 | Old et al. |
| 2007/0006292 A1 | 1/2007 | Jaenicke |
| 2007/0294378 A1* | 12/2007 | Olgaard ................ H04L 41/14 709/223 |
| 2008/0285452 A1* | 11/2008 | Oran ................ H04L 12/2602 370/235 |
| 2011/0158240 A1 | 6/2011 | Sun et al. |

OTHER PUBLICATIONS

Claise et al., "Packet Sampling (PSAMP) Protocol Specifications; rfc5476.txt", Packet Sampling (PSAMP) Protocol Specification; RFC5476 txt, Internet Engineering Task Force, IETF; Standard, Internet Society (ISOC) 4, Rue Des Falaises CH—1205 Geneva, Switzerland, Mar. 1, 2009, XP015065545, 46 pages.
Kaeo et al., "Methodology for Benchmarking IPsec Devices; draft-ietf-bmwg-ipsec-met h-05.txt", Methodology for Benchmarking IPsec Devices; draft-ietf-bmwgipsec-met h-05.txt, Internet Engineering Task Force, IETF; Standardworkingdraft, Internet Society (ISOC) 4, Rue Des Falaises CH—1205 Geneva, Switzerland, vol. bmwg, No. 5, Jul. 28, 2009, XP015063661, 42 pages.
European Search Report corresponding to EP Application 11 16 5728, mailed Sep. 30, 2011, 12 pages.
European Search Report corresponding to EP Application 11 16 5681, mailed Oct. 6, 2011, 10 pages.
European Search Report corresponding to EP Application 11 16 5984, mailed Sep. 6, 2011, 7 pages.

* cited by examiner

METHOD FOR TIME AWARE INLINE REMOTE MIRRORING

CROSS-REFERENCE TO RELATED APPLICATIONS

This application is a continuation of U.S. patent application Ser. No. 14/194,177, filed Feb. 28, 2014 (now U.S. Pat. No. 9,106,520), which is a divisional application of U.S. patent application Ser. No. 13/104,708, filed May 10, 2011 (now U.S. Pat. No. 8,705,395), which claims priority from U.S. Provisional Patent Application Nos. 61/355,040 and 61/355,075, both filed Jun. 15, 2010, the disclosures of which are incorporated herein by reference.

TECHNICAL FIELD

The present invention relates generally to networking and communications technology and, more particularly, to remotely monitoring traffic in a network.

BACKGROUND OF THE INVENTION

Communication networks are widely used today: the variety of networks includes the Internet, wide-area networks (WANs), local-area networks (LANs), telephony networks, and wireless networks. The importance of network monitoring and testing is growing as well as the requirements for the related methods and equipment. Monitoring devices may be implemented within the network for monitoring communication along such network. Such monitoring devices are referred to as "eavesdropping devices" or "passive probes" because they are generally not a party to the communication but are instead monitoring such communication for some reason, such as for performance monitoring of the network, testing, and/or other reasons. The elements that constitute the network may also act as eavesdropping devices because they may take traffic traveling through the device and replicate it on another egress port for use by monitoring or testing devices, as it is done in Switched Port Analyzers (SPAN).

Conventional devices for analyzing traffic packets are attached directly to a monitor port or passive network tap at a switch or element, i.e. the test device needs to be present locally, in proximity to the tested network, which may be undesirable.

A Remote Switched Port Analyzer (RSPAN) is an alternative to a directly connected SPAN or monitor ports. A RSPAN port transport packets across a dedicated connection such as a Virtual Local Area Network (VLAN) link to another location. However, transporting of the packets across a network affects the timing of the packet arrival at the packet analyzing device; in particular, a VLAN link introduces jitter and may cause loss of packets. Additionally, the time when a packet was replicated by a RSPAN port is unknown to the receiving device. It is also impossible for the receiving device to determine if the stream received from the remote egress port has experienced packet loss or timing variances such as jitter and reordering. This has an adverse impact an the accuracy and capability of the receiving device.

Furthermore, conventional simple probes do not allow for filtering of the data down to more targeted packets, and the RSPAN approach provides the bulk of captured traffic without any filtering.

Accordingly, there is a need to mitigate the above disadvantages and to provide a novel method and a system for remote monitoring of traffic packets in a network.

SUMMARY OF THE INVENTION

A method of monitoring packet traffic is provided. The method includes:
at a first access point, capturing portions of traffic packets passing therethrough separated by time intervals;
encapsulating the portions of traffic packets thereby forming encapsulated packets and adding capture timestamps to the encapsulated packets so as to preserve the portions of traffic packets and information related to the time intervals;
optionally, adding sequence numbers to the encapsulated packets; the portions of traffic packets may be fragmented into multiple encapsulated packets;
transmitting the encapsulated packets over a network;
decapsulating the encapsulated packets so as to extract the capture timestamps and obtain replay packets, wherein the replay packets include the portions of the traffic packets; the replay packets may be reassembled; and,
transmitting the replay packets separated by the time intervals, wherein the capture timestamps are used to reproduce the time intervals so as to imitate the traffic packets passing through the first access point.

The time intervals between the traffic packets may be non-periodic intervals. The portions of the traffic packets may be encrypted within the encapsulated packets. The replay packets may be transmitted to a packet analyzer. At the capturing step, the traffic packets may be selected using remotely-configured filters. The step of encapsulating the portions of traffic packets may include fragmentation thereof.

Another aspect of the present invention provides a method of monitoring traffic packets passing through a first access point by a remote device, including:
at a mediator, receiving a request for providing portions of the traffic packets captured at the first access point to the remote device;
registering the mediator so as to receive the portions of the traffic packets captured at the first access point;
at the mediator,
(i) receiving encapsulated packets from a network,
(ii) extracting timestamps from the encapsulated packets,
(iii) decapsulating the encapsulated packets so as to obtain the portions of the traffic packets captured at the first access point, and
(iv) forming replay packets, wherein the replay packets include the portions of the traffic packets; and,
transmitting the replay packets from the mediator to the remote device, wherein the replay packets are separated by time intervals so as to imitate the traffic packets passing through the first access point, and wherein the time intervals are reproduced using the timestamps.

Yet another aspect of the invention provides a packet traffic monitoring system including: a first probe for coupling with a first access point and programmed to capture portions of traffic packets passing therethrough separated by time intervals, and for encapsulating the portions of traffic packets thereby forming encapsulated packets and adding timestamps to the encapsulated packets so as to preserve the portions of traffic packets and information related to the time intervals, and for transmitting the encapsulated packets over a network; and, a mediator suitably programmed to: receive the encapsulated packets from the network, decapsulate the encapsulated packets so as to obtain replay packets and the capture timestamps, wherein the replay packets include the portions of the traffic packets; and, transmit the replay packets separated by the time intervals, wherein the timestamps are used to reproduce the time intervals so as to imitate the traffic packets passing through the first access point.

The system, may include a routing engine for receiving the encapsulated packets from the first probe and providing said packets to the mediator. The system may include a second probe for connecting at a second access point different from the first access point, connected to the routing engine and wherein the mediator interleaves the replay packets associated with the first probe with replay packets associated with the second probe. The first probe and/or second probes may be programmed to encrypt the portions of traffic packets.

BRIEF DESCRIPTION OF THE DRAWINGS

The invention will be described in greater detail with reference to the accompanying drawings which represent preferred embodiments thereof, wherein.

DETAILED DESCRIPTION OF EXEMPLARY EMBODIMENTS

Figure 1:
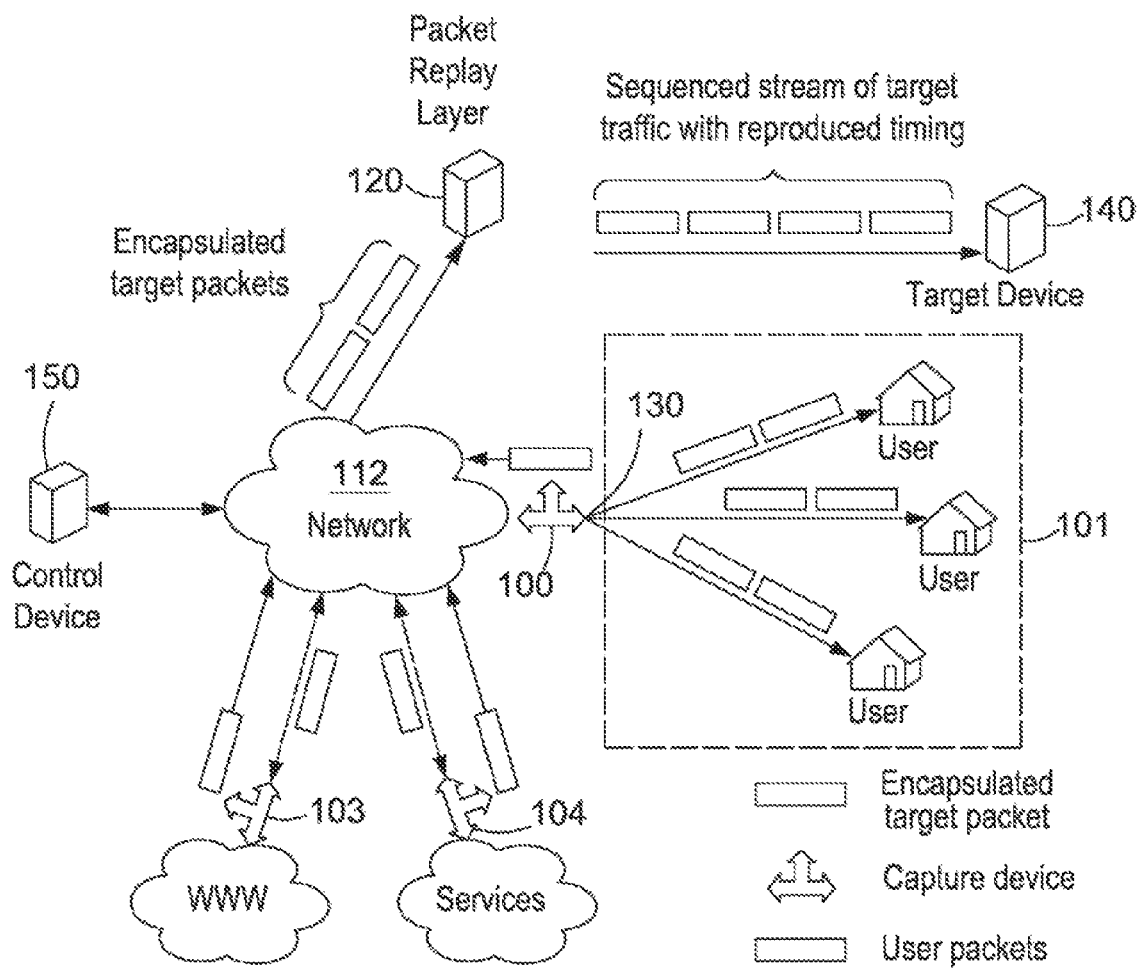
FIG. 1 is a schematic diagram of a network test system for monitoring traffic in a network.

With reference to FIG. 1, a network test system for monitoring traffic in a network 101 includes an Intelligent Packet Director (IPD) 100 and a mediator 120, optionally the system may include a routing engine 150. The network 101 may be any kind of a packet network.

The intelligent packet director 100 is connected at a network access point 130 to the network 101 for capturing traffic packets passing therethrough, or at least portions of the packets, e.g. headers. Hereinafter the terms "traffic packets" and "portions of traffic packets" are used interchangeably and encompass any portion having a non-zero length, up to and including an entire packet. Time intervals separating the traffic packets may be non-periodic time intervals. The IPD 100 may capture all packets passing therethrough or may apply a filter so as to gel only particular packets e.g. selected by a byte pattern, destination or a protocol.

The IPD 100 performs encapsulating the captured traffic packets so as to form encapsulated packets. The encapsulation is necessary in order to preserve the captured data and transport it over a network 112 to a different location without changes such as changes to the destination address field which happen when a packet is conventionally sent over a network without encapsulation. The network 112 may be the same network 101 where the packets are captured, or another network.

The IPD 100 may be an eavesdropping device inserted inline between one or more elements capable of communicating information over a communication network. The IPD 100 may use various time synchronization protocols such as Network Time Protocol (NTP) or IEEE 1588, or any other time synchronization method such as GPS, to synchronize time across a plurality of eavesdropping devices. The IPD 100 contains information needed to communicate packets on an inline sub-channel. The IPD 100 monitors the traffic passing therethrough and may replicate the traffic either selectively or non-selectively. For selective replication the IPD 100 may have metrics stored therein for selecting some of the passing packets. The IPD 100 inspects data contained in network packets passing through it. A configurable protocol header parser may be used in the IPD 100 to identify and inspect known and unknown protocol headers. When the IPD 100 identifies a packet meeting particular criteria, the packet or its portion is replicated, time stamped and stored in an elastic buffer. The IPD 100 constructs an encapsulated packet which contains timing information, such as a timestamp and optionally sequencing information, and responds using addresses stored in memory. The IPD 100 may use techniques described in U.S. Pat. No. 7,336,673 to form a low bandwidth channel by inserting packets into a high bandwidth packet stream.

As discussed above, network nodes may act as probes by copying some traffic packets to an additional output port; the nodes may have the IPD capabilities. Alternatively, the IPD 100 may be a separate device, either having a network address or an unaddressed network eavesdropping device.

The IPD 100 adds timestamps to the encapsulated packets so as to preserve the information related to the time intervals. Optionally, sequence information such as sequence numbers may be added to the encapsulated packets. The captured data may be encrypted using conventional encryption methods.

The timestamps added to the encapsulating portion of the captured packets are referred to as "capture timestamps" since they represent the time when each packet was captured by the IPD 100. The capture timestamps are different from the timestamps which may already be present in the packet prior to the capture, such as Real-Time Transport Protocol (RTP) timestamps or MPEG Decode Time Stamp (DTS) and Presentation Time Stamp (PTS) timestamps; these pre-existing timestamps are preserved as part of the captured packet which is encapsulated so as not to change on transmission to a remote device.

The process of capturing the data and encapsulation introduces a delay between the moment when the data was captured and the capture timestamp was added to the encapsulated packet. However, the delays are very small, and are substantially the same from packet to packet. When the inter-packet intervals are restored and the packets are replayed, the systematic delay does not present a problem.

The IPD 100 transmits the encapsulated packets over the network 112 to the mediator 120. FIG. 1 shows the networks 112 and 101 as two separate networks. By way of example one of the two networks may be a wireless network and another—a wireline (optical or electrical) network. The IPD 100 and the mediator 120 may be connected via a wide area network (WAN); the routing engine 150 may be used for routing encapsulated packets form multiple IPD devices to one or more mediator devices such as the mediator 120 shown in FIG. 1.

The mediator 120, also referred to as a Packet Delivery Gateway (PDG) 120, is connected to the same network 112 whereto the IPD 100 is connected, and receives the encapsulated packets over the network 112 from the IPD 100; the network 112 may be the same network 101 where the traffic packets are captured. The PDG may be a standalone element or may be implemented in software such as a virtual Network Interface Controller (NIC) or Network Driver Interface Specification (NDIS) driver installed on a general purpose or specialized computer.

The mediator 120 extracts the capture timestamps and decapsulates the encapsulated packets and reassembles them, if they have been fragmented across multiple packets, so as to obtain the original packets, or packet portions which have been captured by the IPD 100. The mediator 120 uses this decapsulated data to form replay packets which are the same traffic packets captured at the probe 100.

In case only incomplete packets, e.g. headers, have been encapsulated and sent over the network 112 from the IPD 100 to the mediator 120, at the mediator 120, the replay packets may be extended so as to have all the fields and lengths prescribed by the protocol(s); valid Frame Check Sequence (FCS) fields may also be added to the packets.

The mediator 120 transmits the replay packets to a target device 140, e.g., a network analyzer such as Wireshark. The replay packets are separated by the same time intervals as the corresponding traffic packets captured at the probe 100, wherein the timestamps are used to reproduce the time intervals so as to imitate the traffic packets passing through the access point 130.

The sequence numbers may be used to identify lost data and to order received encapsulated packets prior to decapsulation and thus partially compensate for any jitter or mis-sequencing on the path between the IPD 100 and mediator 120.

The captured data may be encrypted at the IPD 100 and decrypted at the mediator 120 for secure transport over a public network; a variety of conventional encryption algorithms may be used.

The mediator 120 may receive encapsulated packets captured at several probes, e.g. probes 103 and 104 shown in FIG. 1. In addition to receiving encapsulated packets from remote sources, the mediator 120 may receive and buffer packets from local sources. The mediator 120 may merge all received streams and replay them with accurate timing that comes from the capture time-stamps So that the target device 140 receives time-aligned streams from multiple points in a network. If the probes 100, 103 and 104 are synchronized, the multiple streams may be used to measure a delay between disparate points in the network.

Figure 2:
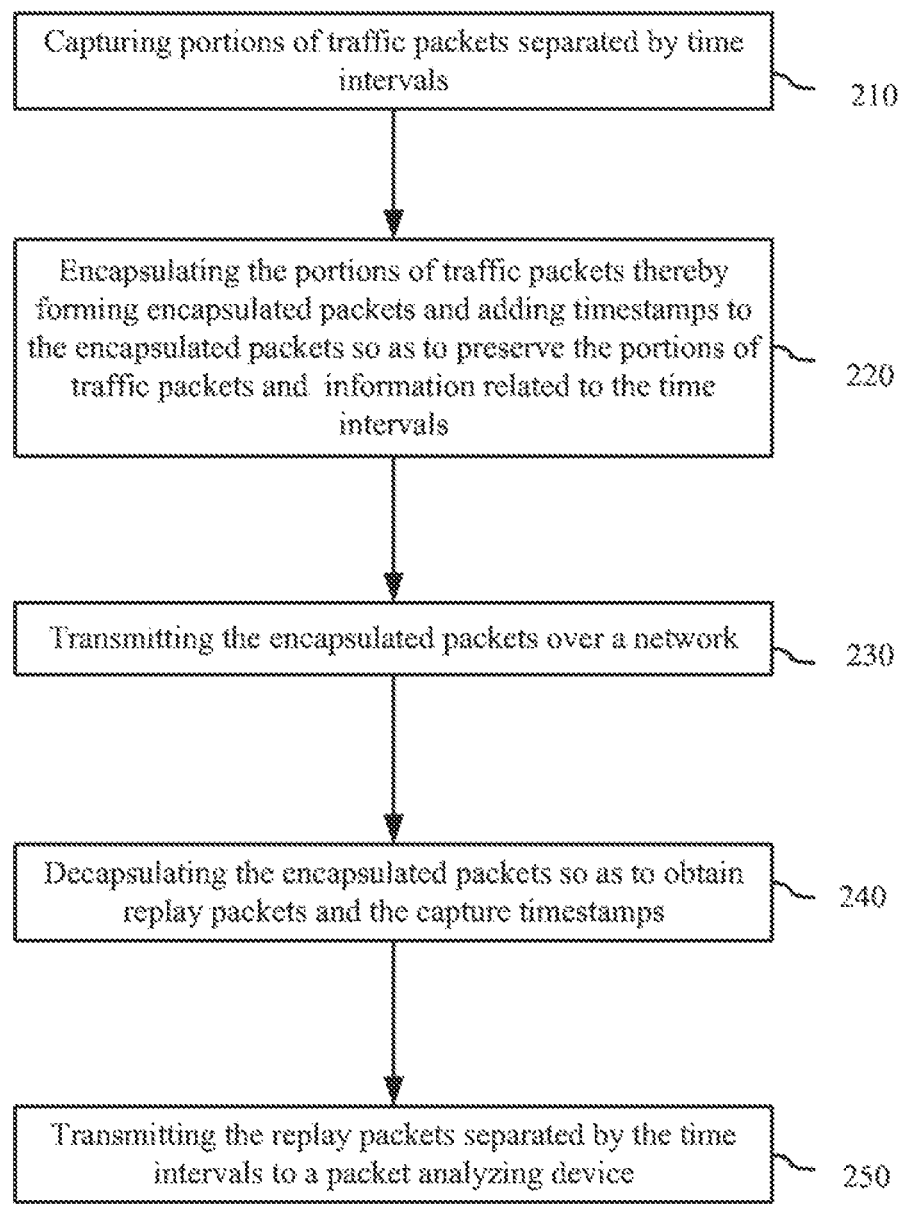
FIG. 2 is a flow chart of a method of monitoring packet traffic.

With reference to FIG. 2, a method of monitoring packet traffic includes a capturing step 210 which involves capturing portions of traffic packets passing therethrough separated by time intervals, and an encapsulation step 220 which involves encapsulating the portions of traffic packets thereby forming encapsulated packets and adding timestamps and optionally sequence numbers and/or additional packet metrics to the encapsulated packets so as to preserve the portions of traffic packets and information related to the time intervals, both steps 210 and 220 performed at a first access point. The method also includes a transmission step 230 where the encapsulated packets are transmitted over a network 112, which may be the monitored network 101 or another network.

After the encapsulated packets have been received from the network 112, they are decapsulated in a decapsulation step 240 so as to obtain replay packets and the capture timestamps, wherein the replay packets include the portions of the traffic packets. In a replay step 250, the replay packets separated by the time intervals are transmitted to a packet analyzing device: the timestamps are used to reproduce the inter packet time intervals; and sequence numbers may be used to identify lost packets. Consequently, the stream received at the analyzing device imitates the traffic packets passing through the first access point wherein the inter-packet intervals are preserved. Optionally, if a packet is identified as being lost, the mediator 120 may generate an identification packet in place of the lost packet to identify its loss.

Figure 3:
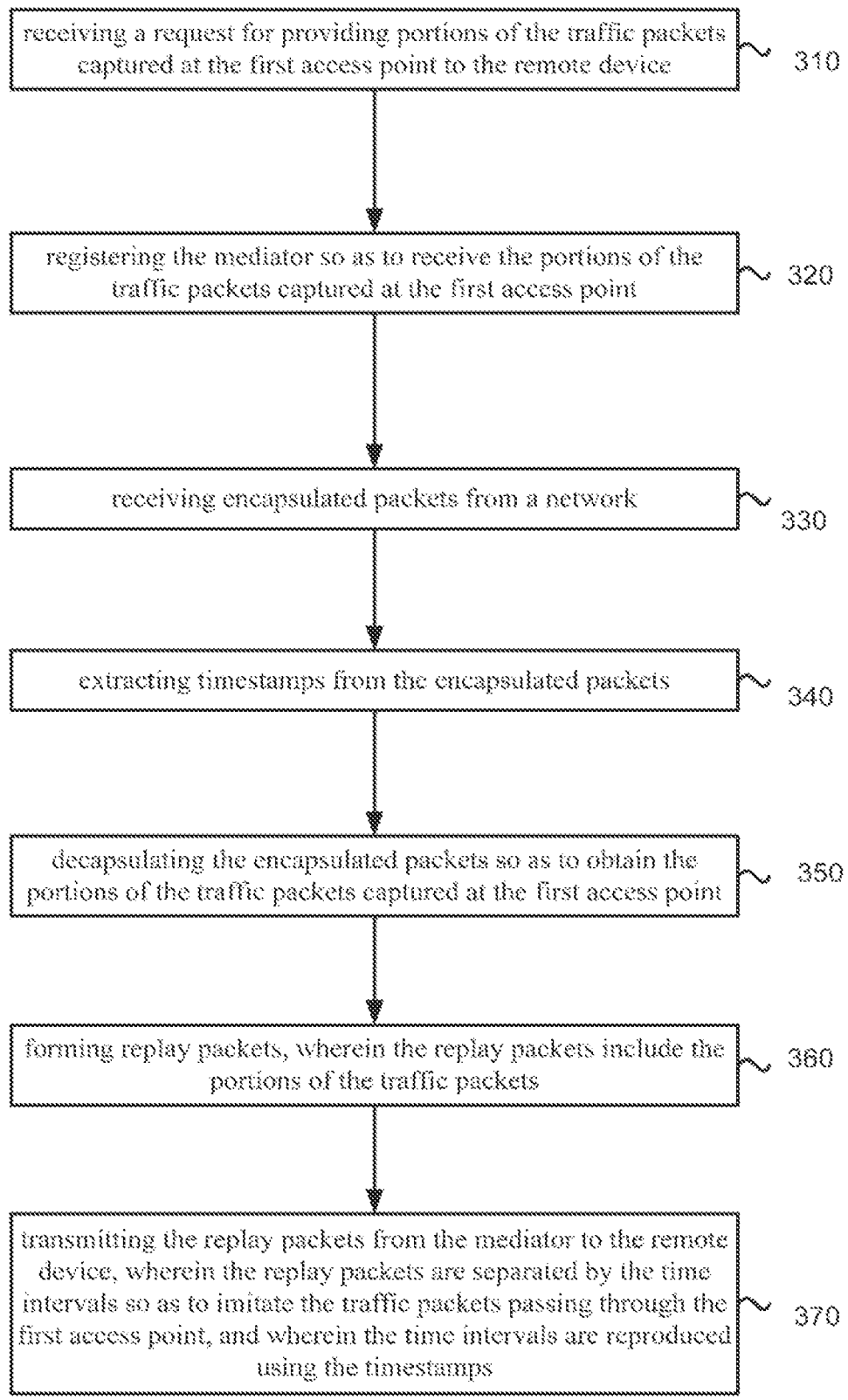
FIG. 3 is a flow chart of a method of monitoring packet traffic.

FIG. 3 illustrates a method of monitoring traffic packets passing through a first access point by a remote device; the method is performed at the mediator 120 and includes the following steps:

receiving a request for providing portions of the traffic packets captured at the first access point to the remote device, an information request step 310;

registering the mediator with a PRE or IPD so as to receive the portions of the traffic packets captured at the first access point, a registration step 320;

receiving encapsulated, packets over a network from the PRE or IPD, a receiving step 330;

extracting timestamps from the encapsulated packets, an extracting step 340;

decapsulating the encapsulated packets so as to obtain the portions of the traffic packets captured at the first access point, a decapsulating step 350;

forming replay packets, wherein the replay packets include the portions of the traffic packets; a replay packets step 360; and, transmitting the replay packets from the mediator to the remote device, wherein the replay packets are separated by the time intervals so as to imitate the traffic packets passing through the first access point, and wherein the time intervals are reproduced using the timestamps, the transmitting step 370.

Figure 4:
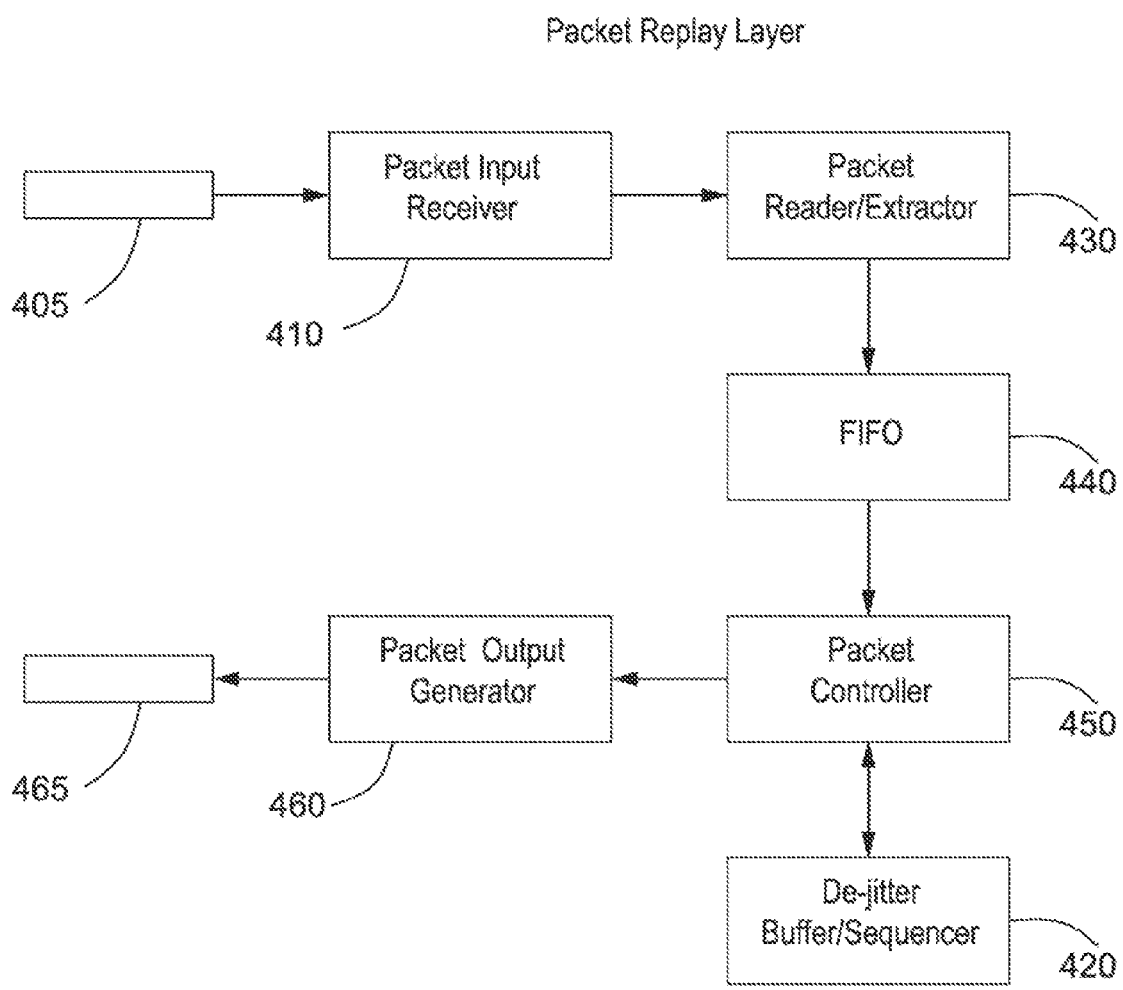
FIG. 4 is a schematic diagram of a mediator.

With reference to FIG. 4, the mediator 140 includes a packet input receiver 410 which receives encapsulated packets 405 from the network 112, a packet reader/extractor 420 which extracts the timestamps and optionally sequence numbers and packet metrics, and decapsulates packets. The mediator 140 further includes a FIFO queue 430, a de-jitter buffer 440, a packet controller 450, and a packet output generator 460 for providing the replay packets to the target device. The above components may be implemented in a combination of software and hardware such as an Application Specific integrated Circuit (ASIC), Field programmable Gate Array (FPGA), network processor, system on a chip such as an FPGA with integrated ARM or micro processor, Complex Programmable Logic Device (CPLD), Erasable programmable logic device (EPLD), Simple programmable logic device (SPLD), or macrocell array.

An IPD may be installed inline with edge devices like switches, routers, Digital Subscriber line Access Multiplexers (DSLAMs), Broadband Remote Access Servers (BRASs), Cable Modem Termination System (CMTSs), Optical Line Terminals (OLTs), and Ethernet Node Bs. An IPD may also be installed anywhere a conventional Small Form-factor Pluggable (SFP) transceiver might be placed. The IPDs may be instructed to look at all frames passing on the link and perform matched filter-logic over each packet. When a match occurs the IPD extracts data from the copy if needed and constructs a results-packet that encapsulates the copy. The encapsulated packets can contain the entire original packet or its portion, e.g. the header or truncated data. The encapsulated packets may be assigned a destination address of the mediator 120 or the routing engine 150.

In one embodiment, the encapsulated packets are assigned a destination address of a Packet Routing Engine (PRE) 150, then inserted into the communication sub-channel to make their way to the Packet Routing Engine (PRE) 150. The Packet Routing Engine 150 is assigned a set of IPD devices to talk to and to receive encapsulated packets from those devices. The Packet Routing Engine 150 processes the encapsulated packets for specific target applications and forwards them to the appropriate end-user application(s) e.g. at the Central Office. End-user applications use PDG software or drivers to decapsulate the original captured packets.

The encapsulated packets may be sent to multiple targets from the PRE 150 if desired. The mediator 120 may be registered with multiple Packet Routing Engines via the System Manager 160 shown in FIG. 5, for receipt of various encapsulated packets network-wide. When receiving routed encapsulated packets, the PRE or System manager conducts its analytics pre-processing and transforms the raw packet data into reports or for other use or analysis. User applications may also dynamically instruct the System manager to refine the IPDs monitoring by enabling/disabling other filters and/or supply an alternative source and destination addresses to the Packet Routing Engine 150 through an open application programming integration interface (API).

The encapsulated packets received at the PDG 120 may have the following general form: Network Encapsulation, TCP/UDP header, Command and Control Header, Original Packet.

The Network Encapsulation is one or more headers which correspond to the protocols in use on the network leading up to the TCP (or UDP) layer. An Example would be Ethernet/IP. The network encapsulation may include Virtual Local Area Network (VLAN), Multi-Protocol Label Switching (MPLS), Generic Routing Encapsulation (GRE), or any other routing or tunneling protocol.

TCP/UDP Header. The packet payload being transmitted to the PDG is sent over TCP to allow reliable transmission. Optionally transmission can be UDP, which is unreliable transport.

The Command and Control (CC) Header is formed during the encapsulation step 220 (FIG. 2). The CC header includes the capture time-stamp indicating when the original packet was captured at the IPD that sent it. The CC header may include sequence numbers, metrics of captured traffic or the particular packet, IPD identification number, packet length, etc.

The Original Packet is the traffic packet as captured by the IPD. The original packet may be fragmented between several encapsulation packets, and/or be only a slice (portion) of the original packet; otherwise the captured packet is unaltered. By way of example the Original Packet portion may include the Ethernet header of the captured packet.

Figure 5:
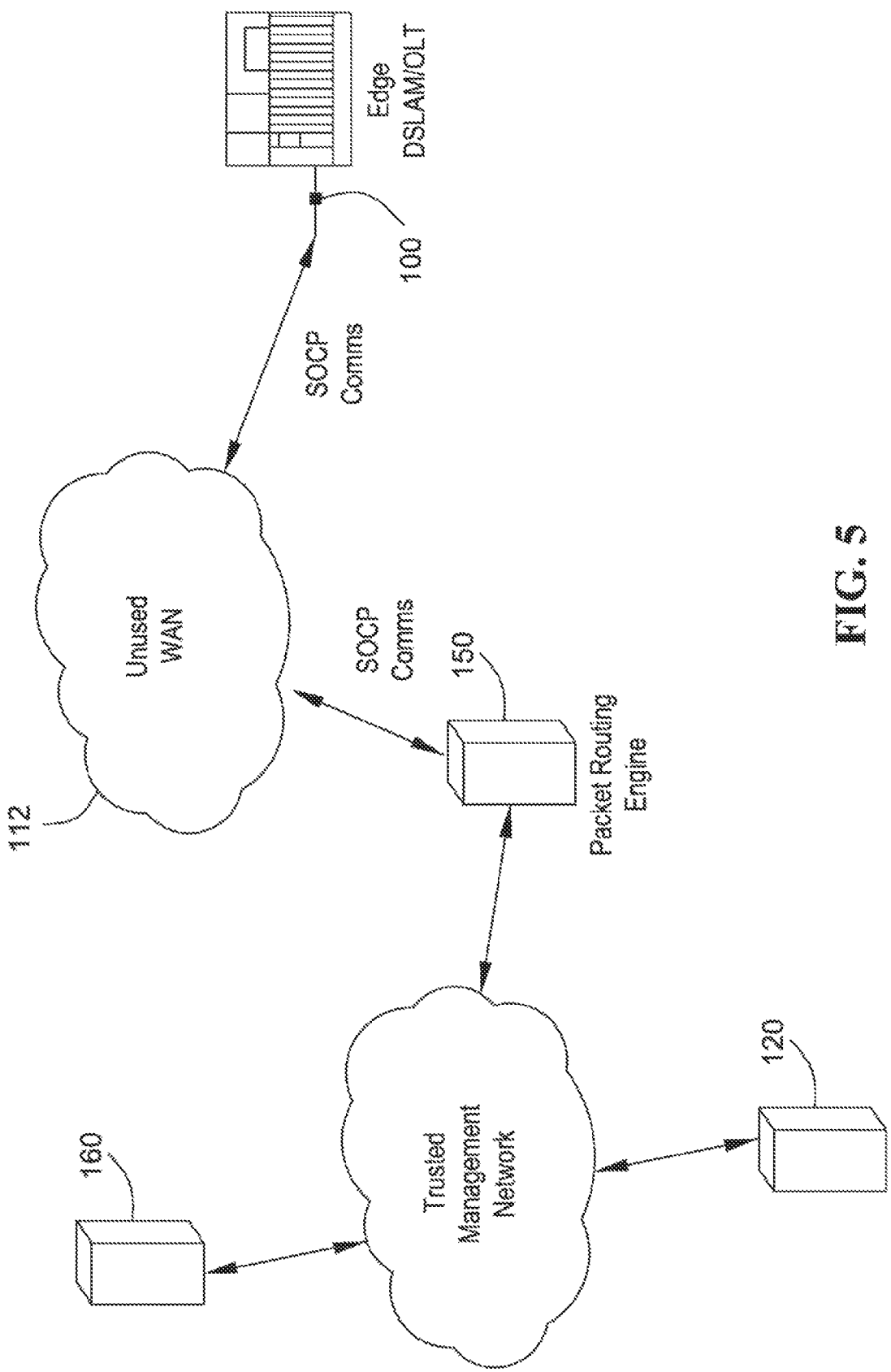
FIG. 5 is a schematic diagram of context of IPD communication flow and command elements in customer's network; and, FIG. 6 is a schematic diagram of the architecture of the Packet Delivery Gateway.

FIG. 5 shows a basic distributed deployment of the traffic monitoring system. The IPDs 100 are usually plugged into routers, DSLAMs and OLTs at the Edge but could be used throughout the service provider's network.

The Packet Routing Engines (PREs) 150 usually sit on the customer network between the Production and Backhaul networks and act as command agents as well as result routers to terminating applications like Wireshark, Snort PDG. Next Generation Network Analysis System (NGNAS), Triple Play Analyzer (TPA) disclosed in U.S. Pat. No. 7,688,754, 3rd party tools, etc., that are used to analyze or measure network packets or data; such tools include protocol analyzers. Quality of Service (QoS) monitors, signaling analyzers, security applications, intrusion detection systems, lawful intercept applications, forensics, performance and response time measures and other network monitoring and troubleshooting tools. They provide a single destination for all command and control communication for an IPD as well as the captured result packets from filtering operations.

The Packet Delivery Gateways (PDGs) 120 may be located within the customer's trusted network and provide an endpoint destination for processing result packet streams from one or more PREs or IPDs. PDGs contain a core driver library of functionality for un-marshalling result packets from PREs or IPDs for use by other applications 140 (FIG. 1).

A Master Clock can provide time synchronization for IPDs through the PREs. The PREs perform all time synchronization with IPDs through its Command and Control protocol stack.

The Master Configuration System and Database server 160 may be located at the customer core management site and is the central point of control.

According to one embodiment of the method, a capture device with time-stamping and optional filtering capability (IPD 100) copies packets with optional filtering from the network; the packets of interest are encapsulated for transmission to a remote destination; the encapsulated packets are time-stamped and optionally provided with sequence numbers and other metrics. A transport network 112 transports encapsulated packets of interest from the Capture device IPD 100 to a packet replay layer. At the packet replay layer, the PDG device 120 receives encapsulated packets of interest from the transport network from one or more devices; it may also receive a local stream on an alternate port which is time-stamped and buffered; the PDG 120 removes transport encapsulations from remote streams, sequences and de-jitters packets to smooth packet replay, may merge multiple streams preserving timing, may also merge remote streams with a buffered local stream, and replays reproduced packet streams on a local network port to a target device 140 with accurate inter-packet timing reproduction; the local network port may be a physical network port or a logical communications port within the packet replay device PDG 120.

A user configuration and control interface allows a user to select network access device(s) such as the IPD 100 and may configure filters for network access device(s) so as to identify packets of interest; the user may configure a number of packets to capture or duration of packet capture; and the user starts packet capture. When several PDG devices are available, the user may select packet replay device to receive packets therefrom. The user configuration and control interface may be implemented in the System Manager 160; alternatively this functionality may be implemented in the PDG, PRE or alternate device receiving the data stream.

The packet analysis tool 140 connects to a local network port on the packet replay device 120 and performs desired packet analysis.

In operation, traffic packets are selected using filters on the IPD 100 and packaged and sent up to the IPD's owning PRE 150. The original traffic packets can be travelling upstream or downstream at the IPD. Which ones are sent to the PRE 150 as part of the feed is determined by how the filter is programmed on the IPD 100. Preferably, every IPD 100 sends the encapsulated packets to the PRE 150, which forwards the packet feed to any application registered to receive them; in this case the application is the PDG 120. The PDG 120 then un-packages the traffic packets and replays them onto a local network. Packet Analyzers 140 represent consumers of the packets that are being replayed.

Figure 6:
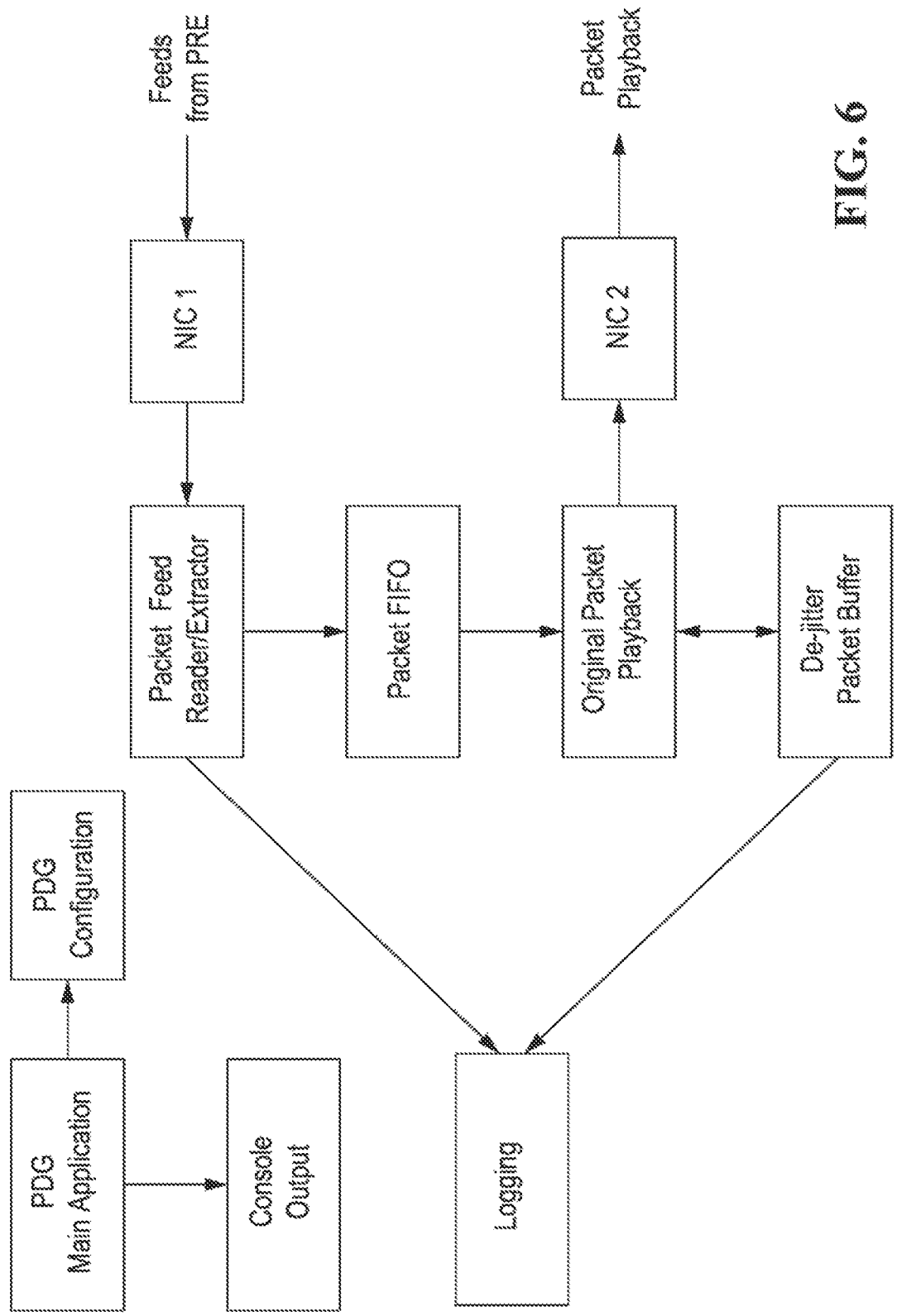

FIG. 6 illustrates the architecture of PDG layer. NIC 1 and NIC 2 are separate network interface cards (NIC) or separate ports on a same NIC so that the Packet Playback never occurs on the same port where the Packet Feeds are being received.

The PDG application includes two threads and a shared packet de-jitter buffer. The main application manages the configuration through the user interface (UI). It also creates, configures, runs and stops all other objects in the system. The execution sequence is as follows: initialization of the application and logging; log start time with command line; parse, validate command line parameters; perform command line parameter specific initialization including creating packet FIFO and de-jitter buffer, instantiate/initialize Packet Feed Reader/Extractor & Packet Playback threads, and wait for any status messages to be printed to console OR a signal to shut down.

Because the encapsulated packets are coming across the network it is certain that the packets in the feeds will arrive with some jitter. In other words, the time it takes a packet to traverse from the IPD 100 to the PRE 150 and on to the PDG 120 will not be the same for all packets. While it may be close, there will always be some variance in the transit time which is what is referred to here as jitter. Since playback is timing sensitive, to maintain the original packet gap times, it is necessary to have some buffering to allow the jitter to be removed. Therefore, the PDG 120 has a de-jitter buffer.

The Packet Reed Reader/Extractor Thread does the following: Based on configuration, opens socket for UDP or TCP feeds; Waits on socket for incoming packets; If shutdown signal from Main Application, exit thread. The thread extracts original packet payload and queues it into Packet FIFO in time-order according to the timestamp in the header. If a packet is fragmented, reassembly must occur here. The thread inserts original payload plus pertinent information like timestamps and sequence numbers into the Packet FIFO; then signals the playback thread and wait for more incoming packets.

The Packet Playback Thread does the following:

Open RAW transmit interface on NIC2 for transmitting packets with their original Frame Check Sequence (FCS) field.

Wait for a signal from Packet Feed Reader or from the Sleep Timer. Arrival of first packet, essentially starts the de-jitter buffer time.

If timer expired signal. Take packet from front of queue and transmit it on NIC2; wait for more incoming packets.

If signal from Packet Reader thread, get packet from head of Packet FIFO.

If this is the first packet, queue the packet in de-jitter buffer, set the Sleep Timer for the depth of the de-jitter buffer, and wait for more incoming packets.

Look at the timestamp of a new packet.

If the timestamp of the new packet is earlier than current time, then the packet has arrived too late and de-jitter buffer is too small, discard the packet and wait for more incoming packets.

If the timestamp of the new packet is equal to current time, transmit the packet on NIC2; wait for more incoming packets.

If the timestamp of the new packet is greater than current time, the packet needs to be transmitted later. Queue the packet to the head of the de-jitter buffer. Adjust Sleep Timer to wake up when the packet should be transmitted. Wait for more incoming packets.

If timestamp of the new packet is later than head of queue, queue the packet into the de-jitter buffer in time order; wait for more incoming packets.

If a signal is received from Sleep Timer, de-queue a head packet from de-jitter buffer and transmit it on NIC2; Set Sleep Timer to wake when a next packet in de-jitter buffer should be transmitted; wait for more incoming packets.

The aforedescribed PDG algorithms may be implemented in a set of instructions stored on a tangible media to be executed by one or more processors.

Advantages of the above method include reduction of time and resources required to setup the data feed of interest because this can be done efficiently at the user's location w/o the need to directly access the equipment at the remote location; such setup does not require additional element ports or network/element configurations. The solution is network-element agnostic, which means that users do not need to be skilled in multiple element features or operating systems to access the data. The simultaneous access to multiple points with the data being aggregated to a single location allows for a reduced/localized investment of test tools. The data streams are reproduced with accurate timing and sequencing so that the test tools get near real-time reproductions of the data which results in easier analysis and problem solving. Many network tools have limited media connection options whereas points in the network can have various media types. The method allows to collect the data of interest from a variety of different media types and deliver them on a single supported media interface simultaneously.

The method solves the problem of remote access to the data of interest from one or more remote locations with the ability to filter the remote data and replay it locally with absolute timing and sequencing that would correct for any transport timing or sequencing impairments that occurred during transport from the remote location.

The method disclosed herein provides for an inline eavesdropping device to timestamp and sequence packets as they are captured. This is advantageous because a receiving device will be able to accurately reproduce packet timing and sequencing as it occurred at the eavesdropping device. The system communicates replicated packets to a receiving device that is not locally connected, possibly using the same network being monitored.

The method allows for a receiving device to receive an encapsulated replicated packet and transmit the carrying packets contents on an egress port to a secondary receiving device that is not capable of interpreting carrying packets. It further provides for the packets transmitted over an egress port to be transmitted with accurate inter-packet timing and sequencing based on the timestamps and sequence numbers in the carrying packet.

The mediator allows to use existing packet traffic analysis tools to analyze the packets as if they were originally occurring on the local network.

In the description above, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly. It will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

We claim:

1. A device comprising:
 a memory configured to store instructions; and
 a processor configured to execute the instructions to:
  receive encapsulated packets including sequence information;
  extract timestamps from the encapsulated packets;
  decapsulate the encapsulated packets so as to obtain portions of traffic packets captured at an access point;
  form, based on decapsulating the encapsulated packets, replay packets,
   the replay packets being separated by time intervals that are reproduced using the timestamps,
   the replay packets being ordered based on the sequence information included in the encapsulated packets, and
   the sequence information including particular information that is used to identify lost packets; and
  transmit the replay packets.

2. The device of claim 1, where the processor, when transmitting the replay packets, is configured to:
 transmit the replay packets to a remote device.

3. The device of claim 1, where the replay packets include at least some of the portions of the traffic packets captured at the access point.

4. The device of claim 1, where the processor is further configured to:
 register the device with one or more packet routing engines.

5. The device of claim 1, where
 the processor is further configured to:
  receive a request to provide information associated with the portions of the traffic packets captured at the access point to a remote device, and
 the processor, when receiving the encapsulated packets, is configured to:
  receive the encapsulated packets based on receiving the request.

6. The device of claim 1, where the sequence information includes sequence numbers.

7. The device of claim 6, where the sequence numbers are used to order the encapsulated packets and reduce jitter in the encapsulated packets.

8. A method comprising:
 receiving, by a device, encapsulated packets including sequence information;
 extracting, by the device, timestamps from the encapsulated packets;
 decapsulating, by the device, the encapsulated packets so as to obtain portions of traffic packets captured at an access point,
 forming, by the device and based on decapsulating the encapsulated packets, replay packets,
  the replay packets being separated by time intervals that are reproduced using the timestamps,
  the replay packets being ordered based on the sequence information included in the encapsulated packets, and
  the sequence information including particular information that is used to identify lost packets; and
 transmitting, by the device, the replay packets.

9. The method of claim 8, where, when transmitting the replay packets, the method includes:
 transmitting the replay packets to a remote device.

10. The method of claim 8, where the replay packets include at least some of the portions of the traffic packets captured at the access point.

11. The method of claim 8, where the method further includes:
 registering the device with one or more packet routing engines.

12. The method of claim 8, where
 the method further includes:
  receiving a request to provide information associated with the portions of the traffic packets captured at the access point to a remote device, and
 when receiving the encapsulated packets, the method includes:
  receiving the encapsulated packets based on receiving the request.

13. The method of claim 8, where the sequence information includes sequence numbers.

14. The method of claim 13, where the sequence numbers are used to reduce jitter in the encapsulated packets.

15. A device comprising:
 a memory configured to store instructions; and
 a processor configured to execute the instructions to:
  capture portions of traffic packets;
  encapsulate the portions of the traffic packets to form encapsulated packets;
  add timestamps to the encapsulated packets to preserve the portions of the traffic packets; and
  transmit the encapsulated packets,
   information associated with the transmitted encapsulated packets being used to form replay packets,
   the replay packets being separated by time intervals that are reproduced using the timestamps, and
   the replay packets being ordered based on sequence information included in the encapsulated packets.

16. The device of claim 15, where the processor, when transmitting the encapsulated packets, is configured to:
 transmit the encapsulated packets on a low-bandwidth channel.

17. The device of claim 16, where the processor is further configured to:
form the low-bandwidth channel.

18. The device of claim 15, where the replay packets include at least some of the portions of the traffic packets.

19. The device of claim 15, where the timestamps are different from other timestamps that are present in the traffic packets prior to capturing of the portions of the traffic packets.

20. The device of claim 15, where the transmitted encapsulated packets are compared with other packets to determine a delay between different locations in a network.

* * * * *